(12) United States Patent  
Perrone et al.

(10) Patent No.: US 11,481,659 B1  
(45) Date of Patent: Oct. 25, 2022

(54) HYPERPARAMETER OPTIMIZATION USING FAIRNESS CONSTRAINTS

(71) Applicant: Amazon Technologies, Inc., Seattle, WA (US)

(72) Inventors: Valerio Perrone, Berlin (DE); Michele Donini, Berlin (DE); Krishnaram Kenthapadi, Sunnyvale, CA (US); Cedric Philippe Archambeau, Berlin (DE)

(73) Assignee: Amazon Technologies, Inc., Seattle, WA (US)

( * ) Notice: Subject to any disclaimer, the term of this patent is extended or adjusted under 35 U.S.C. 154(b) by 289 days.

(21) Appl. No.: 16/917,757

(22) Filed: Jun. 30, 2020

(51) Int. Cl.
  *G06N 20/00* (2019.01)
  *G06N 7/00* (2006.01)
  *G06F 9/54* (2006.01)

(52) U.S. Cl.
  CPC .............. *G06N 7/005* (2013.01); *G06F 9/54* (2013.01); *G06N 20/00* (2019.01)

(58) Field of Classification Search
  CPC .......... G06N 7/005; G06N 20/00; G06F 9/54
  See application file for complete search history.

(56) References Cited

PUBLICATIONS

Toshirio Kamishima, et al., "Fairness-aware Classifier with Prejudice Remove Regularizer", Proceedings of the European Conference on Machine Learning and Principles and Knowledge Discovery in Databases (ECMLPKDD), Part ii, 2012, pp. 35-50.
Toon Calders, et al., "Building Classifiers with Independency Constraints", IEEE Computer Society, 2009 IEEE International Conference on Data Mining Workshops, 2009, pp. 13-18.
Cynthia Dwork, et al., "Fairness Through Awareness", arXiv:1104.3913v2, Nov. 29, 2011, pp. 1-24.
Michael A. Gelbart, et al., "Bayesian Optimization with Unknown Constraints", arXiv:1403.5607v1, Mar. 22, 2014, pp. 1-14.
Michael Feldman, et al., "Certifying and removing disparate impact*", arXiv:1412.3756v3, Jul. 16, 2015, pp. 1-28.
Muhammad Bilal Zafar, et al., "Fairness Constraints: Mechanisms for Fair Classification", arXiv:1507.05259v5, Mar. 23, 2017, pp. 1-12.
Tolga Bolukbasi, et al., "Man is to Computer Programmer as Woman is to Homemaker? Debiasing Word Embeddings", arXiv:1607.06520v1, Jul. 21, 2016, pp. 1-25.
Jon Kleinberg, et al., "Inherent Trade-Offs in the Fair Determination of Risk Scores", arXiv:160.05807v2, Nov. 17, 2016, pp. 1-23.

(Continued)

*Primary Examiner* — Adnan M Mirza
(74) *Attorney, Agent, or Firm* — Robert C. Kowert; Kowert, Hood, Munyon, Rankin & Goetzel. P.C.

(57) ABSTRACT

Hyperparameters for tuning a machine learning system may be optimized for fairness using Bayesian optimization with constraints for accuracy and bias. Hyperparameter optimization may be performed for a received training set and received accuracy and fairness constraints. Respective probabilistic models for accuracy and bias of the machine learning system may be initialized, then hyperparameter optimization may include iteratively identifying respective values for hyperparameters using analysis of the respective models performed using an acquisition function implementing constrained expected improvement on the respective models, training the machine learning system using the identified values to determine measures of accuracy and bias, and updating the respective models using the determined measures.

20 Claims, 7 Drawing Sheets

(56) References Cited

PUBLICATIONS

Sorelle A. Friedler, et al., "On the (im)possibility of fairness", arXiv:1609.07236v1, Sep. 23, 2016, pp. 1-16.

Moritz Hardt, et al., "Equality of Opportunity in Supervised Learning", arXiv:1610.02413v1, Oct. 7, 2016, pp. 1-22.

Blake Woodworth, et al., "Learning Non-Discriminatory Predictors", arXiv:1702.06081v3, Nov. 1, 2017, pp. 1-28.

L. Elisa Celis, et al., "Ranking with Fairness Constraints", arXiv:1704.06840v4, Jul. 30, 2018, pp. 1-32.

Brian Hu Zhang, et al., "Mitigating Unwanted Biases with Adversarial Learning", arXiv:1801.07593v1, Jan. 22, 2018, pp. 1-7.

Sorelle A. Friedler, et al., "A comparative study in fairness-enhancing interventions in machine learning", arXiv:1802.04422v1, Feb. 13, 2018, pp. 1-22.

Michele Donini, et al., "Empirical Risk Minimization Under Fairness Constraints", arXiv:1802.08626v3, Jan. 31, 2020, pp. 1-17.

Alekh Agarwal, et al., "A Reductions Approach to Fair Classifications", arXiv:1803.02453v3, Jul. 16, 2018, pp. 1-18.

Mohammad Yaghini, et al., "A Human-in-the-loop Framework to Construct Context-dependent Mathematical Formulations on Fairness", arXiv:1911.03020v1, Nov. 8, 2019, pp. 1-25.

Flavio P. Calmon, et al., "Optimized Pre-Processing for Discrimination Prevention", In 31st Conference on Neural Information Processing Systems (NIPS 2017), 2017, pp. 1-10.

Geoff Pleiss, et al., On Fairness and Calibration, In 31st Conference on Neural Information Processing Systems (NIPS 2017), 2017, pp. 1-10.

Nitesh V. Chawla, et al., SMOTE: Synthetic Minority Oversampling Technique, Journal of Artificial Intelligence Research 16, Jun. 2002, pp. 321-357.

Daniel Golovin, et al., "Google Vizier: A Service for Black-Box Optimization", ACM, KDD '17, Aug. 13-17, 2017, pp. 1-10.

Alekh Agarwal, et al., "Fair Regression: Quantitative Definitions and Reduction-base Algorithms", in Proceedings of the 36th International Conference on Machine Learning, PMLR 97, 2019, pp. 1-10.

Bobak Shahriari, et al, "Taking the Human Out of the Loop: A Review of Bayesian Optimization", Proceedings of the IEEE 104.1, 2015, pp. 148-175.

Joy Buolamwini, et al, "Gender Shades: Intersectional Accuracy Disparities in Commercial Gender Classification", Proceedings of Machine Learning Research 81:1, 2018, pp. 1-15.

Solon Barocas, et al., "Fairness in Machine Learning Limitations and Opportunities", Incomplete working draft, Retrieved from https://fairmlbook.org, 2020, pp. 1-181.

Jacob R. Gardner, et al., "Bayesian Optimization with Inequality Constraints", in Proceedings of the 31st International Conference on Machine Learning, JMLR: W&CP, vol. 32, 2014, pp. 1-10.

Frank Hutter, et al., "An Efficient Approach for Assessing Hyperparameter Importance", in Proceedings of the 31st International Conference on Machine Learning, JMLR: W&CP, vol. 32, 2014, pp. 1-9.

Shahin Jabbari, et al., "Fairness in Reinforcement Learning", in Proceedings of the 34th International Conference on Machine Learning, PMLR 70, 2017, pp. 1-10.

Donald R. Jones, et al., "Efficient Global Optimization of Expensive Black-Box Functions", Journal of Global Optimization 13, 1998, pp. 445-492.

Faisal Kamiran, et al., "Data preprocessing techniques for classification without discrimination", Springer, Knowl Inf Syst 33, 2012, pp. 1-33.

Richard Zemel, et al., "Learning Fair Representations", in Proceedings of the 30th International Conference on Machine Learning, JMLR: W&CP, vol. 28, 2013, pp. 1-9.

HYPERPARAMETER OPTIMIZATION USING FAIRNESS CONSTRAINTS

BACKGROUND

With the increasing use of machine learning (ML) systems in domains such as financial lending, hiring, criminal justice and college admissions, there has been increasing concern for the potential for these systems to unintentionally encode societal biases resulting in systematic unfairness when data contains sensitive attributes. In some instances, specialized algorithmic fairness techniques may be employed to mitigate these encoded biases but such techniques commonly apply to a single family of ML models and a specific definition of fairness, limiting their effectiveness in practice. In machine learning systems, hyperparameters, parameters whose values are set before the training is performed, may be optimized to develop both accurate and fair machine learning models. This optimization, however, is challenging as various performance metrics and behaviors of the machine learning system and results models cannot be known a priori and evaluating machine learning system training for a specific training data set may be costly and expensive. Furthermore, this process is complicated by a need to consider model-specific bias and accuracy constraints.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as described by the appended claims. The headings used herein are for organizational purposes only and are not meant to be used to limit the scope of the description or the claims. As used throughout this application, the word "may" is used in a permissive sense (e.g., meaning having the potential to), rather than the mandatory sense (e.g., meaning must). Similarly, the words "include," "including," and "includes" mean including, but not limited to.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

DETAILED DESCRIPTION OF EMBODIMENTS

Various techniques for hyperparameter optimization of machine learning models using fairness constraints are described herein. Machine learning models, such as deep neural networks, may be tuned by determining the optimal values of hyperparameters in order to provide optimal performance of the machine learning model. Automated tuning techniques may be implemented, in various embodiments, in order to reduce the burden of discovering and implementing optimal values for hyperparameters. Automated tuning techniques for hyperparameters, like training techniques for machine learning models, can be susceptible to imposing unintended and unfair decisions on various sensitive attributes. Therefore, techniques for hyperparameter optimization of machine learning models using fairness constraints may allow for the development and deployment of machine learning models that can lower or eliminate the risk of unintended and unfair decisions, in various embodiments. Moreover, these techniques may be used in combination with other fairness techniques adapted to specific machine learning models to tune the hyperparameters of those models.

According to some embodiments, resources of a machine learning system may be used to automatically determine optimal hyperparameters for a machine learning model. In some embodiments, one or more constraints on fairness and an indication of a training data set to be used for a machine learning model may be obtained at the service, for example, a storage location or a universal resource locator (URL) from which various observation records of the training data can be read may be obtained. These constraints on fairness may include predefined specifications of fairness or arbitrary fairness definitions and may further include multiple constraints to be enforced simultaneously, in various embodiments. A hyperparameter optimizer may then use the resources of the hyperparameter tuning system to determine optimal parameters for training the machine learning system.

Bayesian Optimization of Hyperparameters

Different techniques for searching for configurations of hyperparameters may be implemented, in some embodiments. Bayesian optimization techniques may be one example of techniques that may be used to search for and identify an optimal configuration of hyperparameters. For example, a function $y(x): X \to R$ may represent a black-box function over a set $X \subset Rp$ for which it is desired to identify a minimum value. In some embodiments, for example, $y(x)$ may be the accuracy, as determined by a measure of validation error or other performance or quality metric, of training of a machine learning model as a function of hyperparameters x (e.g., learning rate, number of layers, dropout rates, etc.). Each evaluation of y(x) may require training the network which may be a costly process, thus motivating a goal to find a minimum value of y(x) using as few evaluations of the black-box function as possible, in some embodiments.

Bayesian optimization may be an efficient approach to find a minimum of the black-box function y(x), where x∈X. A Gaussian process surrogate model may be created for y(x) and iteratively updated by evaluating the black-box function at new points. Points may be selected by optimizing an acquisition function which trades off exploration and exploitation. For example, for a black-box function representing the accuracy or validation error of training of a machine learning model as a function hyperparameters x, the machine learning model may be trained using newly selected hyperparameters points to determine accuracy or validation error.

One criterion used in Bayesian optimization acquisition functions is Expected Improvement (EI) which may be defined as the expected amount of improvement of an evaluation with respect to the current minimum $f(x_{min})$ (or, alternatively, a minimum expected value). For a Gaussian predictive distribution, EI can be defined in closed-form as:

$$EI(x)=E[\max(0,f(x_{min})-f(x))]=\delta^2(x)(z(x)\Phi_n(z(x))+\phi_n(z(x)))z(x):=\mu(x)-f(x_{min})/\delta^2(x)$$

where $\mu$ and $\delta 2$ are the predictive mean and variance of the objective model, and $\Phi n$ and $\phi_n$ are the cumulative distribution function (CDF) and probability density function (PDF) of the standard normal.

These models may only focus on the objective function and are not designed to model fairness constraints and account for their violations. To integrate fairness constraints, an acquisition function may be implemented that optimizes surrogate models subject to these constraints (e.g. fairness constraints), in some embodiments. For example, the following discussion may consider only one fairness constraint $c(x) \le \varepsilon$, $\varepsilon \in R$ but this is not intended to be limiting, and embodiments implementing multiple fair constraints may be envisioned (e.g., where the different fairness constraints may be combined). As constraints may be conditionally independent, an extension to techniques disclosed herein to enable multiple constraints is straightforward. The threshold $\varepsilon \in R$ determines how strictly the fairness constraint should be enforced.

Fairness Definitions

A number of definitions of fairness, or lack of bias, may be used in various embodiments. These definitions of fairness may include predefined specifications of fairness or arbitrary fairness definitions and may further incorporate different definitions of fairness either independently or simultaneously, in various embodiments. In the following example fairness definitions, input data X, an output binary Y in {0, 1}, protected or sensitive attributes S and Y' as a prediction model, e.g. a function mapping examples onto a decision.

In some embodiments, a fairness definition may be based on a predicted outcome given a true label. For a, b in {0, 1} the probability of making a mistake is the same regardless of the value taken by the protected attribute:

$$P(Y'=a|Y=b,S=0)=P(Y'=a|Y=b,S=1)$$

In some embodiments, a fairness definition may be based on a true label given predicted outcome. For a, b in {0, 1} the probability of making a mistake is the same regardless of the value taken by the protected attribute:

$$P(Y'=a|Y'=b,S=0)=P(Y'=a|Y'=b,S=1)$$

Given the above definitions of fairness, a model Y' is $\varepsilon$-fair if:

$$|P(Y'=1|Y=1,S=0)-P(Y'=a|Y=b,S=1)|\le \varepsilon$$

In some embodiments, a fairness definition may be based on a predicted outcome only. The prediction is unaffected by the value of the protected attribute, regardless of the actual true decision. For a, bin {0, 1} the probability is:

$$P(Y'=a|S=0)=P(Y'=a|S=1)$$

Given the above example definitions of fairness, a model Y' may be $\varepsilon$-fair if:

$$|P(Y'=1|S=0)-P(Y'=a|S=1)|\le \varepsilon$$

In some embodiments, an Equal Opportunity (EO) fairness definition may be used. EO may require equal True Positive Rates (TPR) across subgroups, that is:

$$P(Y'=1|Y=1,S=0)=P(Y'=1/Y=1,S=1)$$

For EO, a model Y' is E-fair if the difference in EO (DEO) is at most E:

$$|P(Y'=1|Y=1,S=0)-P(Y'=1/Y=1,S=1)|\le \varepsilon$$

In some embodiments, an Equalized Odds (EOdd) fairness definition may be used. EOdd may require equal False Positive Rates (FPR) in addition to the requirements of EO above.

In some embodiments, a Statistical Parity (SP) fairness definition may be used. SP may require positive predictions to be unaffected by the value of the protected attribute, regardless of the actual true label, that is:

$$P(Y'=1,S=0)=P(Y'=1,S=1)$$

For SP, a model Y' is $\epsilon$-fair if the difference in SP (DSP) is at most E:
|P(Y'=1, S=0)-P(Y'=1, S=1)|≤$\epsilon$ The above definitions of fairness, however, are not intended to be limiting and other definitions can be envisioned. Furthermore, custom definitions of fairness may be employed for training of machine learning models with particular training data sets in some embodiments, and multiple definitions may be imagined to implement a composite definition of fairness in still other embodiments.

A well-known method for implementing constrained Bayesian optimization is constrained Expected Improvement (cEI). If the constraint is denoted by $c(x) \le 0$, a separate regression model is used to learn the constraint function $c(x)$ (typically a GP), and an Expected Improvement (EI) acquisition function is modified in two ways. First, the expected amount of improvement of an evaluation is computed only with respect to the current feasible minimum. Second, hyperparameters with a large probability of satisfying the constraint are encouraged by optimizing $cEI(x)=P(x)EI(x)$, where P(x) is the posterior probability of feasibility under the constraint model, and EI(x) is the standard EI acquisition function.

In some embodiments, EI(x) is defined with respect to the current feasible best, which may not be available in the first iterations. In such cases, P(x) may first be optimized before switching to cEI(x) when the first fair hyperparameter configuration is found.

An exemplary algorithm that describes some embodiments may be:
1: Input: Initial and total budgets $T_0$ and T, unfairness upper bound $\epsilon$, GP prior on objective f(x) and fairness model c(x).

2: Evaluate f($x_i$) and c($x_i$) for i=1, . . . , $T_0$ hyperparameters $x_i$ from the search space (e.g., drawn uniformly at random or from a fixed initial design) and set the used budget t=$T_0$.
3: Define set of evaluated hyperparameters C={($x_i$, f($x_i$), c(xi))}$_{i=1}^{T0}$
4: Compute the posterior GP for the objective and the fairness models based on C.
5: while i<N−M do
6: $x_{new}$=arg ma$_x$ EI(x)P(c(x)≤ϵ).
7: Evaluate f($x_{new}$) and c($x_{new}$).
8: Update C=C∪{(($x_{new}$, f(xnew), c(xnew))}
9: Compute the posterior GP for the objective and the fairness models based on C.
10: t=t+1
11: end while
12: return Best fair hyperparameter configuration in C.

Example System Environment

Figure 1:
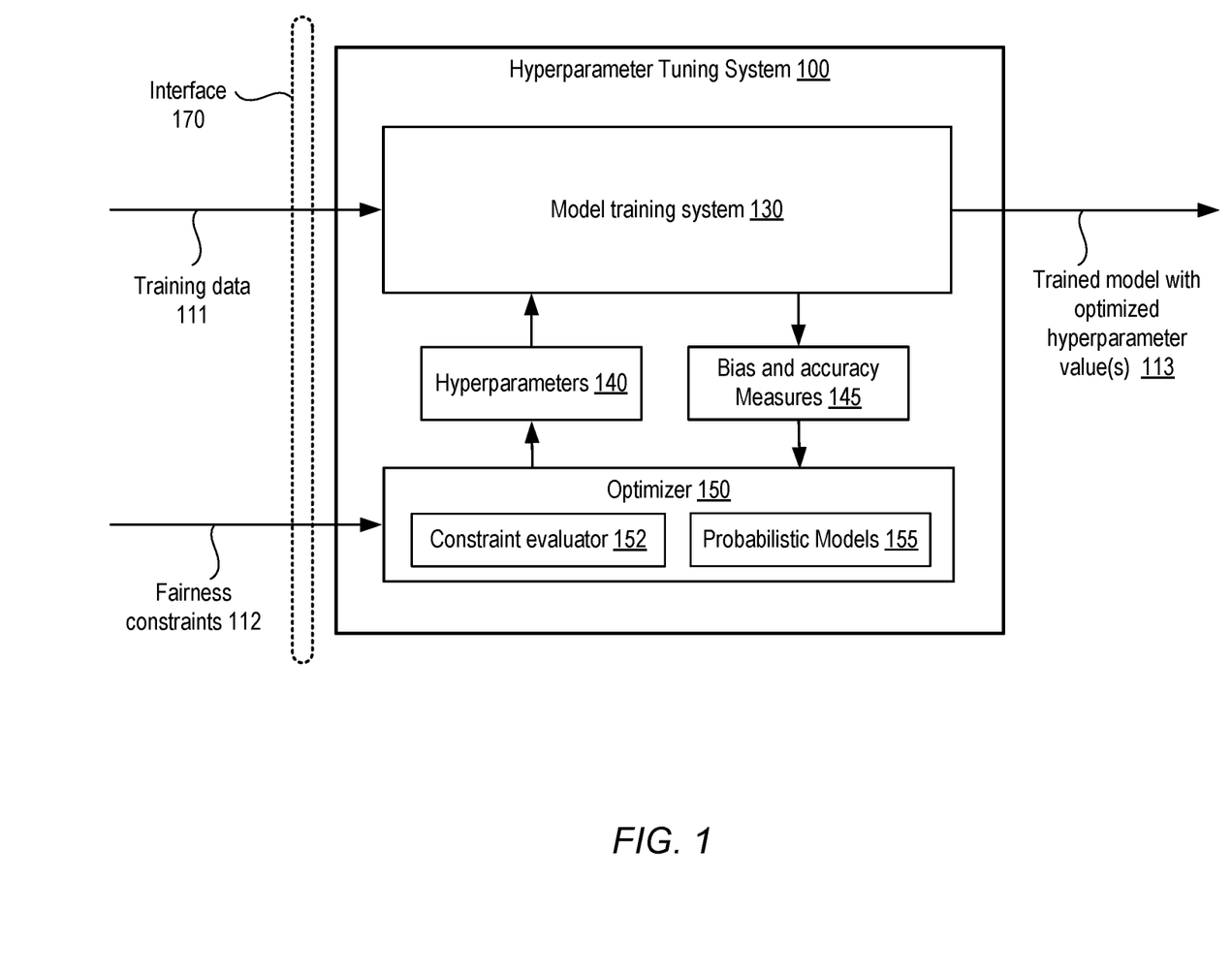
FIG. 1 illustrates an example system environment in which optimization of hyperparameters for training of a machine learning system with fairness constraints may be employed, according to at least some embodiments.

FIG. 1 illustrates an example system environment in which optimization of hyperparameters for training of a machine learning system with constraints may be employed, according to at least some embodiments, using the various techniques discussed above and below. As shown, hyperparameter tuning system 100 may comprise various resources and artifacts and may be implemented as a stand-alone machine learning system or as part of a machine learning service, as discussed below with regard to FIG. 6. In various embodiments, hyperparameter tuning system 100 may include model training system 130 which may generative different respective versions of a machine learning model using different configurations of hyperparameters 140, as discussed in detail below with regard to FIGS. 2-4.

Clients of the machine learning system 110 may submit various types of requests to hyperparameter tuning system 110, via a set of programmatic interfaces 170 such as web-based interfaces, command-line tools and application programming interfaces, including for example requests to tune, train and/or execute machine learning models with constraints. In some embodiments, a front-end for hyperparameter tuning system 100 may act as intermediary between the clients and the service (not illustrated). As such, the front-end may receive the programmatic requests submitted by the clients, parse the requests, distribute the work operations indicated in the programmatic requests to other components of the hyperparameter tuning system 110, collect responses generated by the internal components, and provide the responses to the clients in the appropriate formats.

Hyperparameter tuning for a machine learning model may be instigated by one or more requests to hyperparameter tuning system 130 using training data 111 and fairness constraints 112 to produce trained models 113 usable to produce model results 114, an optimizer 150 may employ probabilistic models 155, in combination with an analysis of fairness constraints 112 and bias and accuracy measures 145 at to determine hyperparameters 140 and direct the model training system 130 to use the determined set of hyperparameters to perform a training operation using the training data 111 to generate additional measures 145. Optimizer 150 may then evaluate the constraints, as indicated at 152, with respect to the generated measures 145 to update the probabilistic models 155 and may further iterate on the above steps to generate an optimized set of hyperparameters 140 for the constraints 112. These optimized hyperparameters 140 may then be used by the machine learning system to generate the trained model 113. In at least some embodiments, as discussed below with regard to FIG. 2, other hyperparameter search techniques may be implemented, such as random search, which optimizer 150 may implement (e.g., by search for random hyperparameter configuration values that do not exceed a fairness constraint).

Example Optimization of Hyperparameters with Constraints

Figure 2:
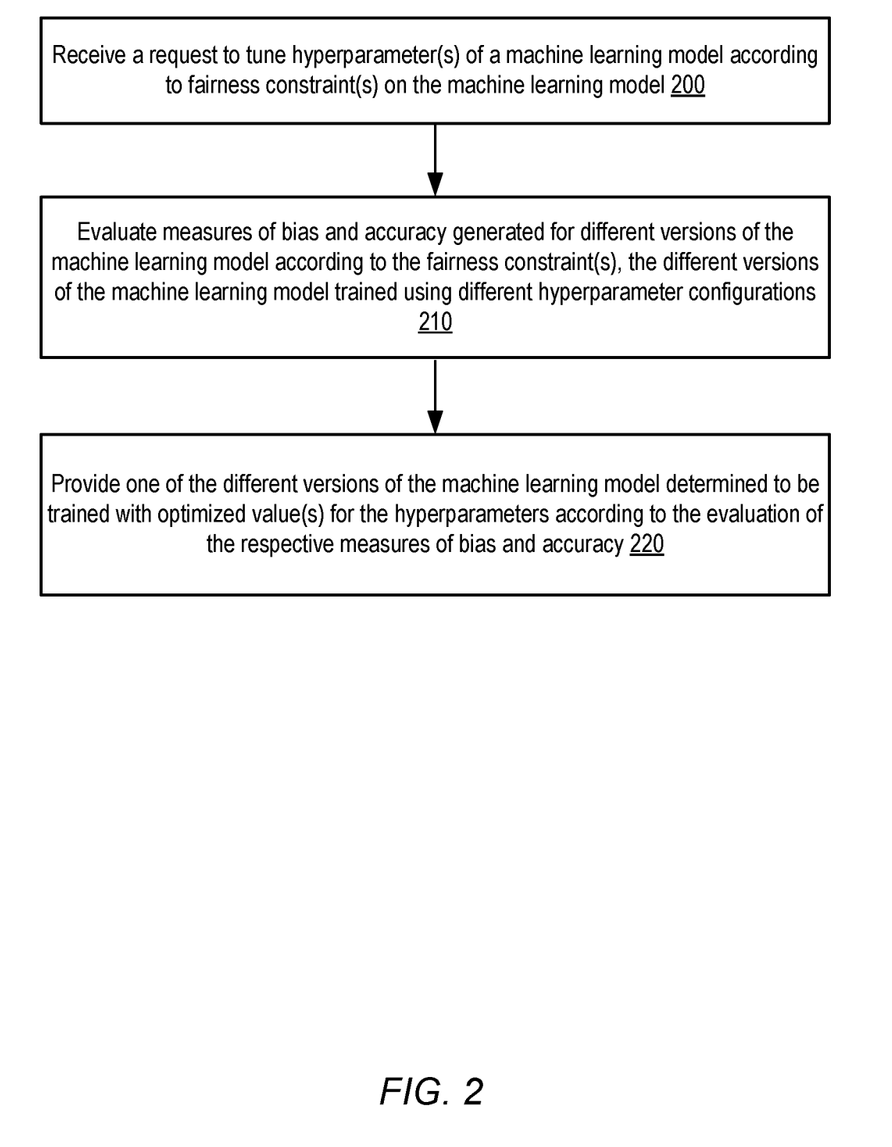
FIG. 2 is a high-level flowchart of optimization of hyperparameters for training of a machine learning model with constraints for accuracy and fairness, according to some embodiments.

FIG. 2 is a high-level flowchart of optimization of hyperparameters for training of a machine learning model with constraints for accuracy and fairness, according to some embodiments. As indicated at 200, a request to tune hyperparameter(s) of a machine learning model according to one or more fairness constraint(s) on the machine learning model may be received, in some embodiments. The request may be received via an interface for a hyperparameter tuning system, as discussed above with regard to FIG. 1 and below with regard to FIG. 2. In some embodiments, the request may specify a search technique to be used for determining hyperparameter configurations, such as a model-free search technique like a random search technique, or a model-based search technique like Bayesian optimization techniques. A fairness constraint may be a threshold, range, or other criteria corresponding to a fairness definition, such as those examples discussed above, which may be evaluated according to a corresponding measure of bias for a model (e.g., satisfied constraint or not satisfied, minimizing a bias measure, etc.).

To optimize the training, an optimizer, such as the optimizer 150 of FIG. 1, may optimize hyperparameters 140 of the model training system 130 of FIG. 1 in order to minimize validation error. In addition, one or more constraints on fairness or bias may be received, such as a constraints 112, as shown in FIG. 1, which may be obtained via a programmatic interface 170 of FIG. 1. Additionally, other information pertaining to the model training, for example training data 111 for the model training system 130 as shown in FIG. 1, may also be obtained.

As indicated at 210, measures of bias and accuracy may be generated for different versions of the machine learning model may be evaluated according to fairness constraints, where the different versions of the machine learning model may be trained using different hyperparameter configurations, in some embodiments. For example, each hyperparameter configuration may include respective values for one of more hyperparameters for the machine learning model, such as the hyperparameters 140 as shown in FIG. 1. Hyperparameter configurations may be chosen using a random search (or other model-free fashion), as discussed above, in some embodiments. In some embodiments, a Bayesian optimization search may be employed using statistical models initialized with evaluations of model training using one or more randomly selected hyperparameter configurations such as discussed further below in FIG. 3 may be implemented to determine different hyperparameter configurations. In other embodiments, hyperparameter optimization may be implemented using a random search, where training of the machine learning model may be evaluated at a plurality of randomly chosen hyperparameter configurations using selection criteria that excludes hyperparameter configurations that are unlikely to be fair at a given probability threshold. The above examples, however, are not intended to be limiting and any number of search techniques may be employed.

As noted above, different trained versions of the machine learning model may generate respective measures of model accuracy, or training error, as well as respective measures of bias. These respective measures may, in some embodiments, collectively be used to define probabilistic models of accuracy and bias for the training of the machine learning model. In some embodiments, these probabilistic models may be used to select additional hyperparameter configurations for evaluation while in other embodiments, only selection of hyperparameter configurations without consideration of probabilistic models may be used.

In some embodiments, as discussed below with regard to FIG. 3, once an evaluation of training of the machine learning model using a number of hyperparameter configurations has been performed, a determination may be made of whether a stop condition has been satisfied. In some embodiments, this determination may be made using and evaluation of the generated measures of accuracy and bias. In other embodiments, the determination may be made using an evaluation of probabilistic models, while in still other embodiments the determination may be made using a predetermined number of iterations, an amount of training time, or amount of resource utilization. Such decisions, however, are not intended to be limiting and any number of stop conditions may be imagined.

As indicated at 220, one of the different versions of the machine learning may be provided that is determined to be trained with optimized value(s) for the hyperparameter(s) according to the evaluation of the respective measures of bias and accuracy, in some embodiments. For example, a highest accuracy measure with a lowest bias measure (or with a measure below a constraint threshold) may be identified from among the different generated machine learning models. The hyperparameter values of the hyperparameter configuration used to train the model with such measures (e.g., highest accuracy and satisfying fairness constrained) may be identified as the optimized values for the one or more hyperparameters. The trained model with the optimized values may be stored, sent, deployed, or otherwise made accessible in response to the request to hyperparameters. In at least some embodiments, the measures used to identify the provided version of the machine learning model may be provided.

Example Bayesian Optimization of Hyperparameters with Constraints

Figure 3:
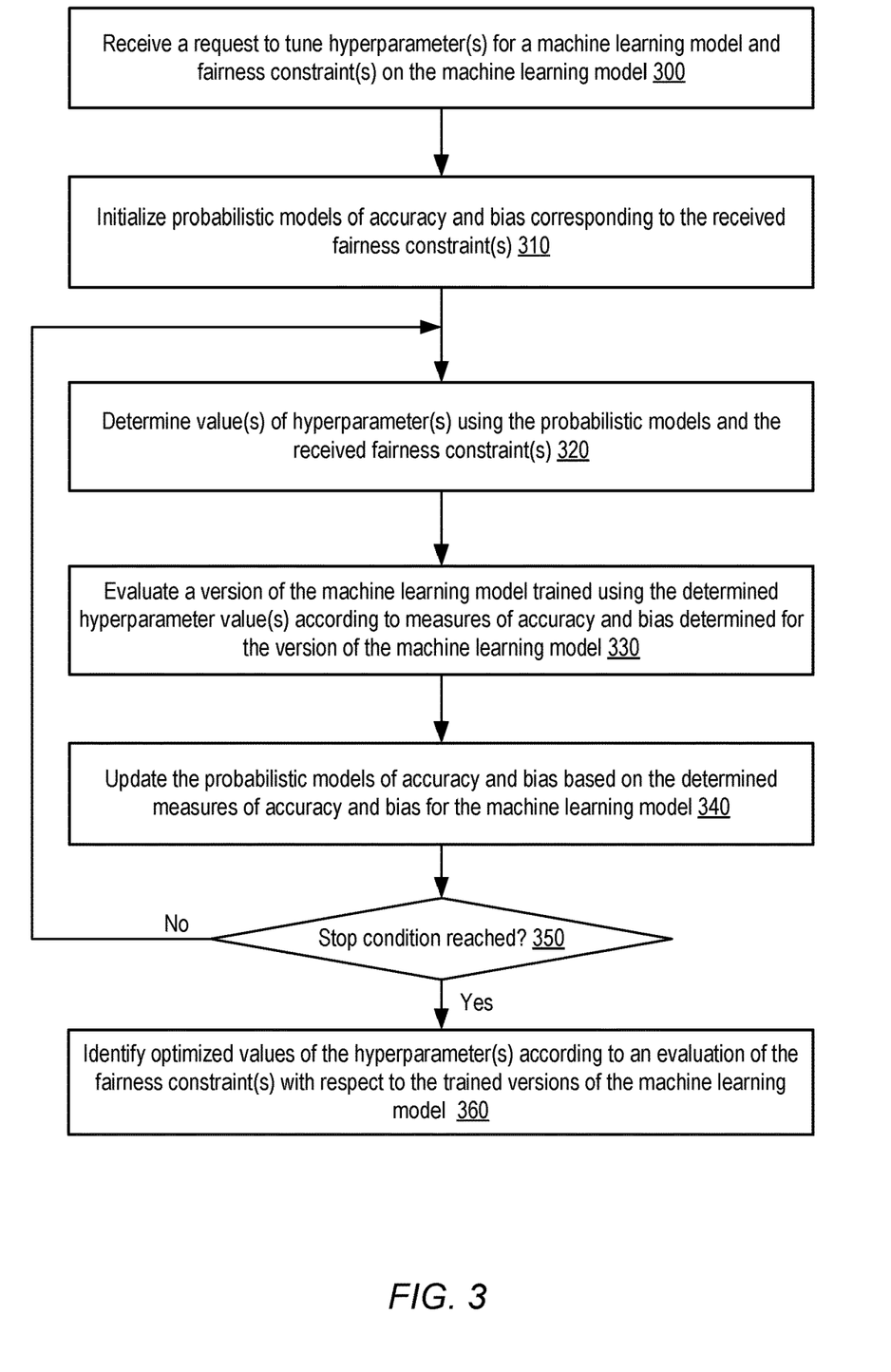
FIG. 3 is a high-level flowchart of Bayesian optimization of hyperparameters for training of a machine learning model using constraints for accuracy and fairness, according to some embodiments.

FIG. 3 is a high-level flowchart of Bayesian optimization of hyperparameters for training of a machine learning model using a constraint for bias, according to some embodiments. Bayesian optimization starts at step 300 where a request to tune hyperparameters of a machine learning model using a fairness constraint may be received, such as though a programmatic interface 170 as shown in FIG. 1. To optimize the training, an optimizer, such as the optimizer 150 of FIG. 1, may optimize hyperparameters 140 of the model training system 130 of FIG. 1 in order to minimize validation error. In addition, one or more constraints on fairness or bias may be received, such as a constraints 112, as shown in FIG. 1, which may be obtained via a programmatic interface 170 of FIG. 1. Additionally, other information pertaining to the objective function, for example training data 111 for the model training system 130 as shown in FIG. 1, may also be obtained.

Once the request is received, optimization proceeds to step 310 where probabilistic models of accuracy and bias are initialized. In some embodiments, initialization may include evaluation of training of the machine learning model at one or more points. In various ones of these embodiments, selection of initial points for evaluation may occur in a number of ways. For example, one of more points may be selected through a random or ordered search. Once individual ones of the initial points are evaluated, respective sets of measurements of accuracy and bias may be determined and provided to the Bayesian optimizer, for example the metrics 145 provided to the optimizer 150 as shown in FIG. 1. These respective sets of measurements may be used to initialize the probabilistic models for use in the Bayesian optimizer 150.

Once the probabilistic models have been initialized, optimization proceeds to step 320 where one or more iterations of the optimizer may be performed in some embodiments to refine the probabilistic models. First, respective values of hyperparameters are determined using the probabilistic functions and an acquisition function which considers the received constraint on bias. In some embodiments, this acquisition function may implement constrained expected improvement search as discussed herein. After determining hyperparameter values, the optimizer proceeds to step 330. Further detail of the identifying step 320 is provided in FIG. 4 below.

At step 330, a version of the machine learning model trained using the identified hyperparameters may be evaluated according to measurements of accuracy and bias for the version of the version of the machine learning model, in some embodiments. These measurements may then be used by the optimizer to refine the probabilistic models in step 340.

Once the probabilistic models are updated in step 340, a determination may be made whether a stop condition for tuning has been satisfied. In some embodiments, this determination may be made using an evaluation of the determined set of metrics. In other embodiments, the determination may be made using an evaluation of the probabilistic models, while in still other embodiments the determination may be made using a predetermined number of iterations or amount of time. Such decisions, however, are not intended to be limiting and any number of stop conditions may be imagined. If the stop condition is not satisfied, the optimization returns to step 320 to further refine the probabilistic models. Otherwise, the optimization proceeds to step 360.

In step 360, the optimization determines optimized hyperparameters using the refined probabilistic functions and the acquisition function. Optimization is then complete.

A hyperparameter tuning system, or other optimization engine may perform the techniques discussed above with regard to FIG. 1. In some embodiments, the hyperparameter tuning system, or other optimization engine may be implemented as part of a machine learning system or service. In some embodiments, the hyperparameter tuning system, or other optimization engine may be implemented as a stand-alone system or service.

Identifying Hyperparameter Values

Figure 4:
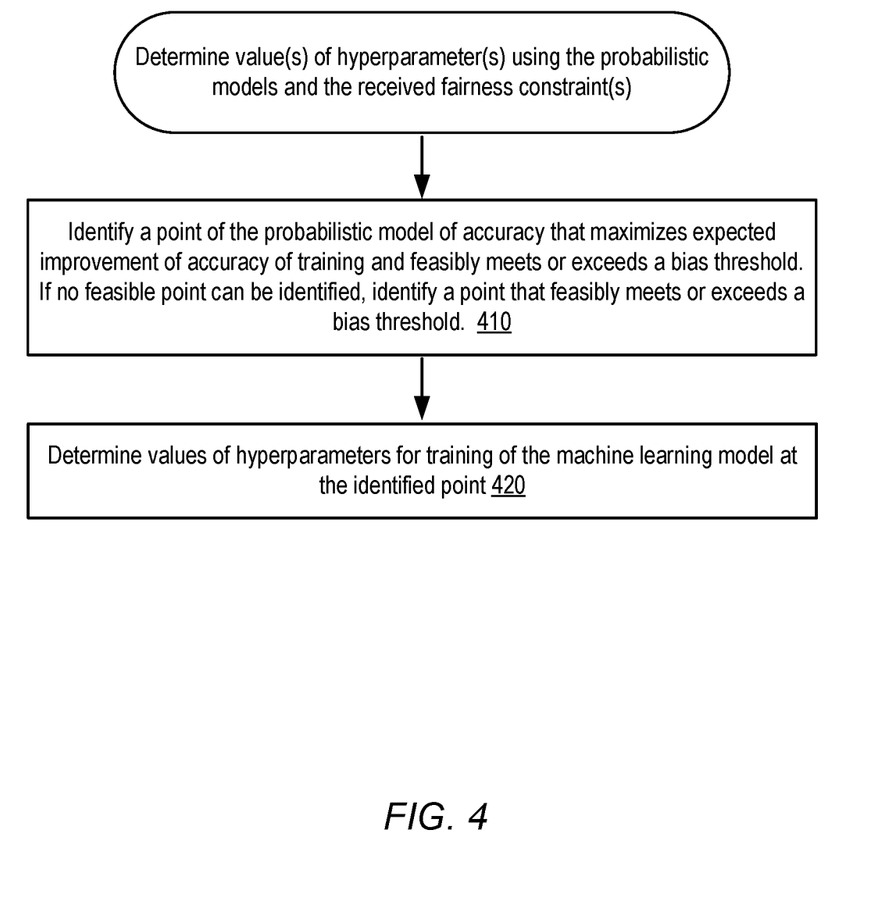
FIG. 4 is a high-level flowchart of identifying values of hyperparameters for training of a machine learning model using an acquisition function implementing constrained expected improvement search using probabilistic models for accuracy and bias, according to some embodiments.

FIG. 4 is a high-level flowchart of identifying values of hyperparameters for training of a machine learning model using an acquisition function implementing constrained expected improvement using probabilistic models for accuracy and bias of the machine learning model, according to some embodiments. The process begins at step 410 where a point of the probabilistic model of training accuracy may be identified that maximizes an expected improvement in accuracy of training and feasibly meets the fairness constraint according to the probabilistic model of bias.

In some embodiments, the probabilistic model of bias may initially not identify any feasible points meeting the fairness constraint. In such case, a point may instead be identified which may feasibly meet the fairness constraint.

Once a point is identified, the process proceeds to step 420 where respective values of hyperparameters at the identified point are determined. The process is then complete.

Programmatic Interactions

Figure 5:
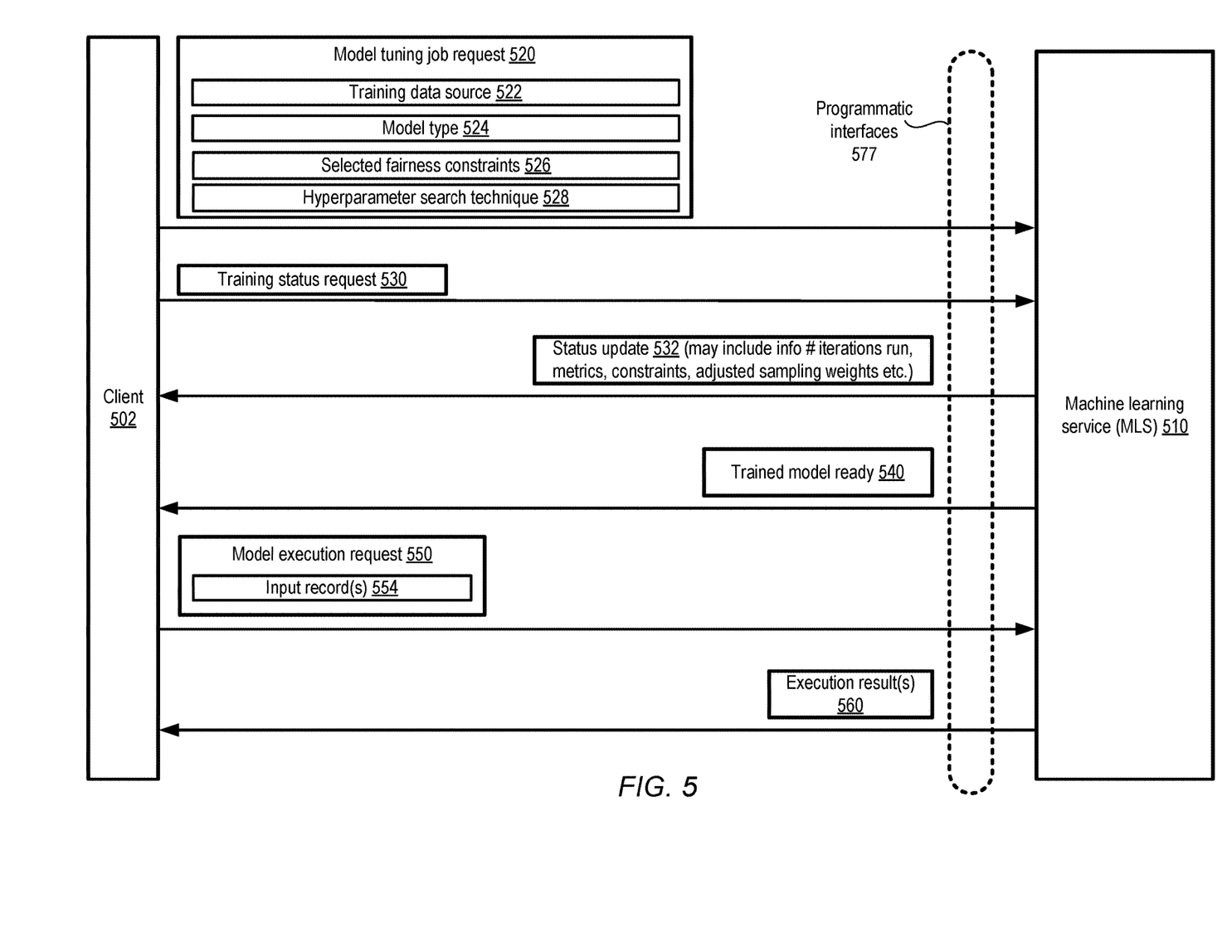
FIG. 5 illustrates example programmatic interactions between clients and a machine learning service at which tuning of hyperparameters for a machine learning model with fairness constraints, according to at least some embodiments.

FIG. 5 illustrates example programmatic interactions between clients and a machine learning service at which tuning of hyperparameters for a machine learning model with fairness constraints, according to at least some embodiments. A machine learning service 510 (which may be similar to machine learning service 671 in FIG. 6) may implement one or more programmatic interfaces 577 in the depicted embodiment, such as a set of APIs, a web-based console, command-line tools, graphical user interfaces, and the like. Using such a programmatic interface, a client 602 may submit a model tuning job request 520 to the machine learning service 510 in the depicted embodiment. The training request may indicate a training data source 522, a model type 524, and/or one or more selected fairness constraints pertaining to the training of the model. For example, machine learning service 510 may provide or support a pre-defined set of fairness constraints, in some embodiments. Various explanations and/or definitions of the supported fairness constraints may be provided, in some embodiments, such as descriptions via interfaces 577 or via publicly available documentation for machine learning service 510 (e.g., a web-based API or other service specification). Selected fairness constraints 526 may be identified as parameters, fields, flags, or other indications in request 520, in some embodiments.

In at least some embodiments, fairness constraint(s) may be user-defined. For example, a bias or fairness threshold range or maximum specification of risk for a particular type machine learning model application (e.g., classification labels) may be specified in model job tuning request 520 in some embodiments. In some embodiments, machine learning service 510 may implement validation or other approval techniques before accepting and tuning a machine learning model using a user-defined fairness constraint (e.g., by reviewing how respective attributes are treated by the fairness constraint to ensure that sensitive attributes are not intentionally (or unintentionally) skewed in an unfair manner by the constraint).

Figure 6:
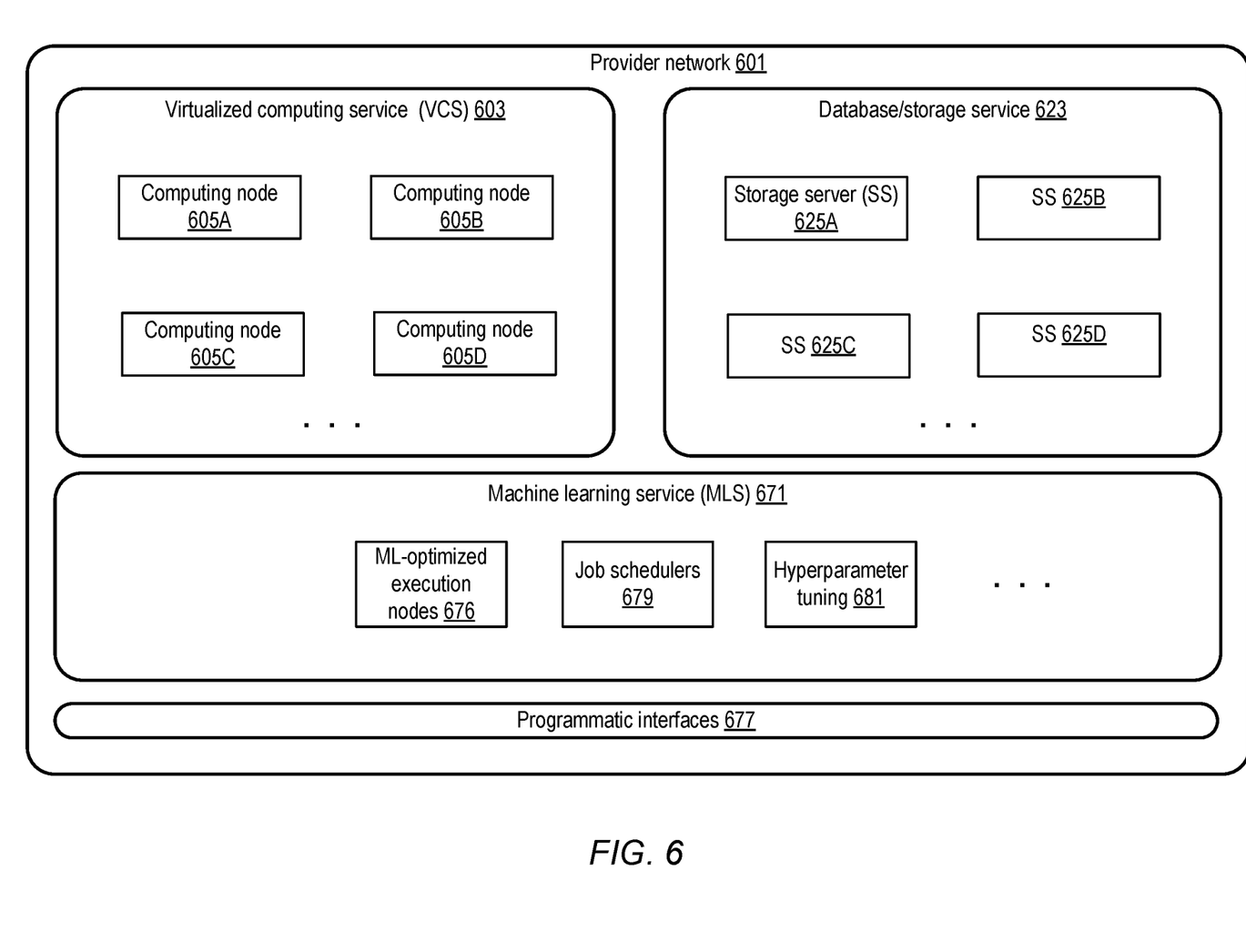
FIG. 6 illustrates a provider network environment implementing a machine learning service that may implement hyperparameter tuning using fairness constraints, according to at least some embodiments.

The model type 524 may, for example, indicate that a neural network model is to be trained. In some embodiments, the model may be identified in a data store or repository (e.g., a data storage service 623 that stores models), or may be uploaded or specified as part the tuning request.

In at least some embodiments, hyperparameter search technique 528 may be specified for a model tuning job request. For example, a specific type of search techniques, such as Bayesian optimization, Bayesian optimization with constrained Expected Improvement, Gaussian probabilistic models, acquisition functions, or other features of a model-based search may be identified at 528. In some embodiments, a model-free search techniques, such as random search, may be identified at 528. In some embodiments, stop conditions or other configuration information for performing a model tuning job request may be specified in model tuning job request 520 that is not illustrated.

The client 502 may submit model execution requests 550 indicating one or more input records for which predictions are to be generated using the trained version of the model. The results 560 of the model execution may be transmitted to the client 502.

In some embodiments, during the training phase of the model, a training status request 530 may be submitted periodically by the client 502 to the MLS 510. In response, a status update 532 may be provided, indicating for example how many training iterations have been run, current status of determined measures such as accuracy of the machine learning model and bias values, and/or the current sampling weights assigned to the different training examples. In at least one embodiment, such updated training status information may be provided using a visualization interface, which may be refreshed automatically.

Provider Network Environment

In some embodiments, the techniques discussed above for at which Bayesian optimization of hyperparameters for training of a machine learning system may be implemented at a provider network. FIG. 6 illustrates a provider network environment implementing a machine learning service that may implement hyperparameter tuning using fairness constraints, according to at least some embodiments. Networks may establish an entity such as a company or a public sector organization to provide one or more network-accessible services (such as various types of cloud-based computing, storage or analytics services) accessible via the Internet and/or other networks to a distributed set of clients may be termed provider networks in one or more embodiments. A provider network may sometimes be referred to as a "public cloud" environment. The resources of a provider network may in some cases be distributed across multiple data centers, which in turn may be distributed among numerous geographical regions (e.g., with each region corresponding to one or more cities, states or countries).

In the depicted embodiment, provider network 601 may comprise resources used to implement a plurality of services, including for example a virtual computing service (VCS) 603, a database or storage service 623, and a machine learning service (MLS) 671. Components of a given service may utilize components of other services in the depicted embodiment—e.g., for some machine learning tasks, a component of the machine learning service 671 may utilize virtual machines implemented at computing nodes such as 605A-605C and ML-optimized execution node 676 of the virtualized computing service. Input data, intermediate results, final results and/or other artifacts of various machine learning algorithms or models, such as models using randomized learning algorithms for which Bayesian optimization of hyperparameters may be employed, may be stored at storage servers 1025 (e.g., 625A-625D) of the database or storage service 623 in some embodiments. Individual ones of the services shown in FIG. 6 may implement a respective set of programmatic interfaces 677 which can be used by external and/or internal clients (where the internal clients may comprise components of other services) in the depicted embodiment.

In some embodiments, requests to train some types of machine learning models may be handled as batch jobs at the machine learning service, and a batch job scheduler 679 may orchestrate the allocation of resources for the jobs as well as dependencies among jobs. In the depicted embodiment, hyperparameter tuning 681 for the MLS 671 may be employed, for example, to optimize hyperparameter values according to the various techniques discussed above. In at least one embodiment, a machine learning service 671 may have access to or include a set of execution nodes 676 that are optimized for machine learning tasks (e.g., nodes that have customized hardware such as GPU arrays and/or customized software stacks). Depending on the suitability of such nodes for the models being trained using adaptive sampling, one or more execution nodes 676 may be employed for training and/or executing such models in the depicted embodiment.

In at least some embodiments, the techniques discussed earlier for Bayesian optimization of hyperparameters for an objective function with constraints may be implemented using non-specialized computing nodes of the virtualized computing service 703. In some embodiments, the techniques described above may be implemented without acquiring resources of network-accessible services such as those shown in FIG. 6. For example, a standalone tool implemented at one or more computing devices which are not part of a network-accessible service may be used in some embodiments.

Illustrative Computer System

Figure 7:
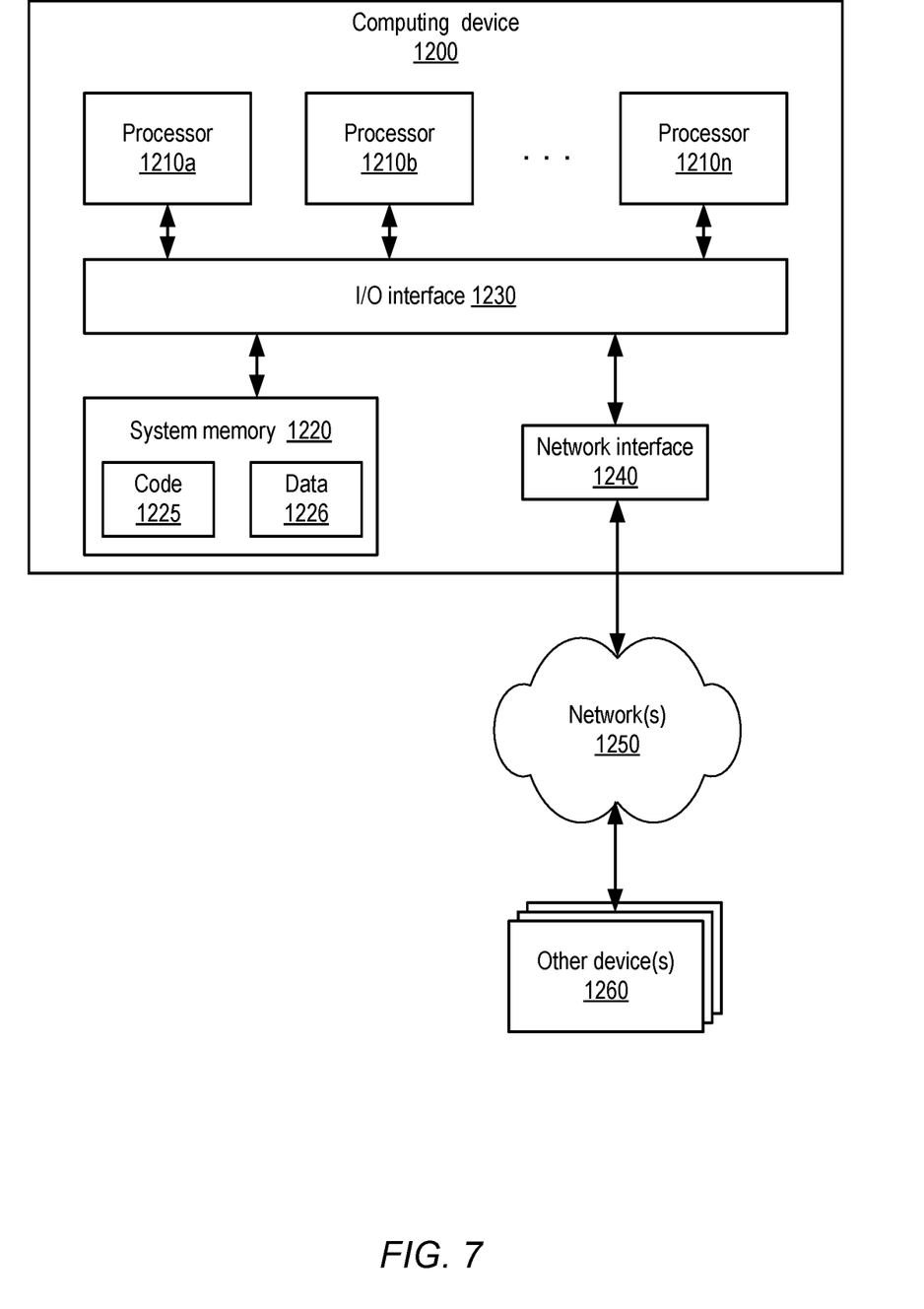
FIG. 7 is a block diagram illustrating an example computing device that may be used in at least some embodiments.

In at least some embodiments, a server that implements a portion or all of one or more of the technologies described herein, including optimizing hyperparameters for training and executing machine learning models, may include a general-purpose computer system that includes or is configured to access one or more computer-accessible media. FIG. 7 illustrates such a general-purpose computing device 1200. In the illustrated embodiment, computing device 1200 includes one or more processors 1210 coupled to a system memory 1220 (which may comprise both non-volatile and volatile memory modules) via an input/output (I/O) interface 1230. Computing device 1200 further includes a network interface 1240 coupled to I/O interface 1230.

In various embodiments, computing device 1200 may be a uniprocessor system including one processor 1210, or a multiprocessor system including several processors 1210 (e.g., two, four, eight, or another suitable number). Processors 1210 may be any suitable processors capable of executing instructions. For example, in various embodiments, processors 1210 may be general-purpose or embedded processors implementing any of a variety of instruction set architectures (ISAs), such as the x86, PowerPC, SPARC, or MIPS ISAs, or any other suitable ISA. In multiprocessor systems, each of processors 1210 may commonly, but not necessarily, implement the same ISA. In some implementations, graphics processing units (GPUs) may be used instead of, or in addition to, conventional processors.

System memory 1220 may be configured to store instructions and data accessible by processor(s) 1210. In at least some embodiments, the system memory 1220 may comprise both volatile and non-volatile portions; in other embodiments, only volatile memory may be used. In various embodiments, the volatile portion of system memory 1220 may be implemented using any suitable memory technology, such as static random access memory (SRAM), synchronous dynamic RAM or any other type of memory. For the non-volatile portion of system memory (which may comprise one or more NVDIMMs, for example), in some embodiments flash-based memory devices, including NAND-flash devices, may be used. In at least some embodiments, the non-volatile portion of the system memory may include a power source, such as a supercapacitor or other power storage device (e.g., a battery). In various embodiments, memristor based resistive random access memory (ReRAM), three-dimensional NAND technologies, Ferroelectric RAM, magnetoresistive RAM (MRAM), or any of various types of phase change memory (PCM) may be used at least for the non-volatile portion of system memory. In the illustrated embodiment, program instructions and data implementing one or more desired functions, such as those methods, techniques, and data described above, are shown stored within system memory 1220 as code 1225 and data 1226.

In one embodiment, I/O interface 1230 may be configured to coordinate I/O traffic between processor 1210, system memory 1220, and any peripheral devices in the device, including network interface 1240 or other peripheral interfaces such as various types of persistent and/or volatile storage devices. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments some or all of the functionality of I/O interface 1230, such as an interface to system memory 1220, may be incorporated directly into processor 1210.

Network interface 1240 may be configured to allow data to be exchanged between computing device 1200 and other devices 1260 attached to a network or networks 1250, such as other computer systems or devices as illustrated in FIG. 1 and FIG. 6, for example. In various embodiments, network interface 1240 may support communication via any suitable wired or wireless general data networks, such as types of Ethernet network, for example. Additionally, network interface 1240 may support communication via telecommunications/telephony networks such as analog voice networks or digital fiber communications networks, via storage area networks such as Fibre Channel SANs, or via any other suitable type of network and/or protocol.

In some embodiments, system memory 1220 may be one embodiment of a computer-accessible medium configured to store program instructions and data as described above for FIG. 1 and FIG. 6 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 1200 via I/O interface 1230. A non-transitory computer-accessible storage medium may also include any volatile or non-volatile media such as RAM (e.g. SDRAM, DDR SDRAM, RDRAM, SRAM, etc.), ROM, etc., that may be included in some embodiments of computing device 1200 as system memory 1220 or another type of memory. Further, a computer-accessible medium may include transmission media or signals such as electrical, electromagnetic, or digital signals, conveyed via a communication medium such as a network and/or a wireless link, such as may be implemented via network interface 1240. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device", as used herein, refers to at least all these types of devices, and is not limited to these types of devices.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of methods may be changed, and various elements may be added, reordered, combined, omitted, modified, etc.

Various modifications and changes may be made as would be obvious to a person skilled in the art having the benefit of this disclosure. It is intended to embrace all such modifications and changes and, accordingly, the above description to be regarded in an illustrative rather than a restrictive sense.

What is claimed is:

1. A system, comprising:
   at least one processor; and
   a memory, storing program instructions that when executed cause the at least one processor to:
   receive, at a hyperparameter tuning system, a request to tune one or more hyperparameters for a machine learning model according to one or more selected fairness constraints supported by the hyperparameter tuning system;
   execute, by the hyperparameter tuning system, a tuning job to perform the requested tuning of the one or more hyperparameters for the machine learning model, wherein to execute the tuning job, the program instructions cause the at least one processor to:
   evaluate respective measures of bias and accuracy generated for different respective versions of the machine learning model based, at least in part, on the one or more selected fairness constraints, wherein the different respective versions of the machine learning model are trained using a plurality of different hyperparameter configurations;
   determine respective optimized values of the one or more hyperparameters for the machine learning model according to the evaluation of the respective measures of bias and accuracy; and
   store one of the different respective versions of the machine learning model trained according to the determined optimized values for the one or more hyperparameters.

2. The system of claim 1, wherein the plurality of different hyperparameter configurations are determined using respective probabilistic models of accuracy of the machine learning model and bias of the machine learning model using a Bayesian optimization search.

3. The system of claim 1, wherein the plurality of different hyperparameter configurations are determined using an acquisition function implementing a constrained expected improvement search for the fairness constraint.

4. The system of claim 1, wherein the hyperparameter tuning system is implemented as part of a machine learning service offered by a provider network, and wherein the request is received via an Application Programming Interface (API) implemented by the machine learning service, and wherein the selected one or more fairness constraints are one or more of a plurality of fairness constraints supported by the machine learning service and selectable via the API.

5. A method, comprising:
   receiving, via an interface of a hyperparameter tuning system, a request to tune one or more hyperparameters of a machine learning model according to a fairness constraint on the machine learning model;
   evaluating, by the hyperparameter tuning system, respective measures of bias and accuracy generated for different respective versions of the machine learning model based, at least in part, on the fairness constraint, wherein the different respective versions of the machine learning model are trained using a plurality of different hyperparameter configurations; and
   providing, by the hyperparameter tuning system, one of the different respective versions of the machine learning model determined to be trained with respective optimized values of the one or more hyperparameters for the machine learning model according to the evaluation of the respective measures of bias and accuracy.

6. The method of claim 5, wherein the plurality of different respective hyperparameter configurations are determined using a random search.

7. The method of claim 6, wherein the plurality of different hyperparameter configurations are determined using respective probabilistic models of accuracy of the machine learning model and bias of the machine learning model using a Bayesian optimization search.

8. The method of claim 7, wherein an acquisition function used as part of the Bayesian optimization search is a constrained expected improvement search applicable to the fairness constraint.

9. The method of claim 7, wherein at least one of the respective probabilistic models is a Gaussian process model.

10. The method of claim 5, wherein the request specifies the fairness constraint, and wherein the specified fairness constraint comprises a plurality of fairness definitions.

11. The method of claim 5, further comprising:
    receiving a training data set via the interface, wherein the different respective versions of the machine learning model are trained using the training data set; and
    wherein the fairness constraint comprises a constraint on biased classification of one or more labels of the training data set.

12. The method of claim 5, wherein the plurality of different respective hyperparameter configurations are determined using a hyperparameter search technique specified by the request to tune the one or more hyperparameters.

13. One or more non-transitory, computer-readable storage media, storing program instructions that when executed on or across one or more computing devices cause the one or more computing devices to implement a machine learning system that implements:
    receiving, via an interface of a hyperparameter tuning system, a request to tune one or more hyperparameters of a machine learning model according to one or more fairness constraints on the machine learning model;
    training, by the hyperparameter tuning system, different respective versions of the machine learning model using a plurality of different hyperparameter configurations;
    evaluating, by the hyperparameter tuning system, respective measures of bias and accuracy generated for the different respective versions of the machine learning model based, at least in part, on the one or more fairness constraints; and
    providing, by the hyperparameter tuning system, one of the different respective versions of the machine learning model determined to be trained with respective optimized values of the one or more hyperparameters for the machine learning model according to the evaluation of the respective measures of bias and accuracy.

14. The one or more non-transitory, computer-readable storage media of claim 13, wherein the request specifies applying a random search to determine the plurality of different hyperparameter configurations.

15. The one or more non-transitory, computer-readable storage media of claim 14, wherein the request specifies applying a Bayesian optimization search to determine the plurality of different hyperparameter configurations.

16. The one or more non-transitory, computer-readable storage media of claim 15, wherein an acquisition function used as part of the Bayesian optimization search is a constrained expected improvement search applicable to the one or more fairness constraints.

17. The one or more non-transitory, computer-readable storage media of claim 15, wherein the training and the evaluating are performed until a stop condition specified by the request to tune the one or more hyperparameters for the machine learning model is satisfied.

18. The one or more non-transitory, computer-readable storage media of claim 13, wherein the request comprises respective fairness definitions and respective fairness thresholds for the one or more fairness constraints.

19. The one or more non-transitory, computer-readable storage media claim 14, storing further program instructions that when executed by the one or more computing devices cause the one or more computing devices to further implement providing at least some of the respective measures of bias and accuracy generated for the different respective versions of the machine learning model responsive to a status request for the tuning of the one or more hyperparameters.

20. The one or more non-transitory, computer-readable storage media of claim 13, wherein the hyperparameter tuning system is implemented as part of a machine learning service offered by a provider network, and wherein the request is received via an Application Programming Interface (API) implemented by the machine learning service, and wherein the one or more fairness constraints are one or more of a plurality of fairness constraints supported by the machine learning service and selectable via the API.

* * * * *